United States Patent [19]

Baek

[11] Patent Number: 5,420,642
[45] Date of Patent: May 30, 1995

[54] APPARATUS AND METHOD FOR SEARCHING INPUT PICTURE IN TELEVISION RECEIVER

[75] Inventor: Woon K. Baek, Kyungsangbook-Do, Rep. of Korea

[73] Assignee: Goldstar Co., Ltd., Seoul, Rep. of Korea

[21] Appl. No.: 166,015

[22] Filed: Dec. 14, 1993

[30] Foreign Application Priority Data

Dec. 17, 1992 [KR] Rep. of Korea ................ 1992-24720

[51] Int. Cl.⁶ ............................................. H04N 5/45
[52] U.S. Cl. .................................... 348/565; 348/732
[58] Field of Search ............... 348/564, 565, 731, 732, 348/734; H04N 5/45, 5/50

[56] References Cited

U.S. PATENT DOCUMENTS 5,040,067  8/1991  Yamakazi ............................ 348/565
5,251,034 10/1993  Na ....................................... 348/565
5,285,284  2/1994  Takashima et al. ............. 348/565 X Primary Examiner—Victor R. Kostak

[57] ABSTRACT

An apparatus and a method for searching an input picture in a television receiver. The apparatus comprises first and second intermediate frequency processing circuits for processing broadcasting signals detected by first and second tuners at audio and video intermediate frequencies, a video signal processing circuit for processing a video signal from the first intermediate frequency processing circuit so that it can be displayed as a main picture, a key matrix unit having a key for selecting a POP mode and a key for selecting a stop mode, a microprocessor for outputting a plurality of control signals to perform the POP and stop modes selected by the key matrix unit, a switching circuit for selecting one of a video signal from the second intermediate frequency processing circuit and external input video signals under the control of the microprocessor, a synchronous signal detector for detecting a synchronous signal from an output video signal from the switching circuit, a PIP processing circuit for processing the output video signal from the switching circuit so that it can be displayed as a sub-picture, a picture ratio converter for converting a video signal ratio into a main picture to sub-picture ratio, and a color signal processing circuit for displaying an output video signal from the picture ratio converter on a Braun tube.

3 Claims, 6 Drawing Sheets

APPARATUS AND METHOD FOR SEARCHING INPUT PICTURE IN TELEVISION RECEIVER

BACKGROUND OF THE INVENTION

1. Field Of The Invention

The present invention relates in general to television receivers which are capable of performing a picture-out-picture (referred to hereinafter as POP) mode, and more particularly to an apparatus and a method for searching an input picture in a television receiver in which a video signal inputted through a channel of the television receiver and an external input video signal can be searched together.

2. Description Of The Prior Art

Referring to FIG. 1, there is shown a block diagram of a conventional apparatus for searching an input picture in a television receiver. As shown in this drawing, the conventional input picture search apparatus comprises a first tuner 1 for detecting a broadcasting signal received through an antenna, a second tuner 2 for detecting a different broadcasting signal received through a different antenna, a first intermediate frequency processing circuit 3 for processing the broadcasting signal Va detected by the first tuner 1 at audio and video intermediate frequencies to separate audio and video signals from the broadcasting signal Va, and a second intermediate frequency processing circuit 4 for processing the broadcasting signal Vb detected by the second tuner 2 at audio and video intermediate frequencies to separate audio and video signals from the broadcasting signal Vb.

A video signal processing circuit 5 is provided in the conventional input picture search apparatus to process the video signal Vi1 from the first intermediate frequency processing circuit 3 so that it can be displayed as a main picture.

A picture-in-picture (referred to hereinafter as PIP) processing circuit 6 is also provided in the conventional input picture search apparatus to process the video signal Vi2 from the second intermediate frequency processing circuit 4 so that it can be displayed as a sub-picture.

A picture ratio converter 7 is also provided in the conventional input picture search apparatus to convert a ratio of an output video signal V1 from the video signal processing circuit 5 to an output video signal V2 from the PIP processing circuit 6 into a main picture to sub-picture ratio.

Also, the conventional input picture search apparatus comprises a color signal processing circuit 8 for displaying an output video signal V3 from the picture ratio converter 7 on a Braun tube, and a microprocessor 10 for outputting a plurality of control signals to perform a function selected by a key matrix unit 9.

The operation of the conventional input picture search apparatus with the above-mentioned construction will hereinafter be described with reference to FIGS. 1 to 3.

FIG. 2 is a view illustrating pictures displayed in a PIP mode in a general television receiver and FIG. 3 is a view illustrating pictures displayed in a POP mode in the general television receiver.

First, the broadcasting signal Va detected by the first tuner 1 is processed at the audio and video intermediate frequencies by the first intermediate frequency processing circuit 3 and the broadcasting signal Vb detected by the second tuner 2 is processed at the audio and video intermediate frequencies by the second intermediate frequency processing circuit 4. As a result, the audio and video signals Ai1 and Vi1 are outputted from the first intermediate frequency processing circuit 3 and the audio and video signals Ai2 and Vi2 are outputted from the second intermediate frequency processing circuit 4.

The video signal Vi1 from the first intermediate frequency processing circuit 3 is processed by the video signal processing circuit 5 so that it can be displayed as the main picture. As a result, the video signal processing circuit 5 outputs the resultant video signal V1 to be displayed as the main picture. The video signal Vi2 from the second intermediate frequency processing circuit 4 is processed by the PIP processing circuit 6 so that it can be displayed as the sub-picture. As a result, the PIP processing circuit 6 outputs the resultant video signal V2 to be displayed as the sub-picture.

In the case where the PIP mode or the POP mode is selected by the key matrix unit 9 under this condition, the picture ratio converter 7 converts the ratio of the video signal V1 from the video signal processing circuit 5 to the video signal V2 from the PIP processing circuit 6 into the main picture to sub-picture ratio in response to the control signal Ctl3 from the microprocessor 10. For example, if the ratio of the video signal V1 to the video signal V2 is 4:3, it may be converted into 16:9 by the picture ratio converter 7. Also, if the ratio of the video signal V1 to the video signal V2 is 16:9, it may directly be outputted by the picture ratio converter 7.

The resultant video signal V3 from the picture ratio converter 7 is processed by the color signal processing circuit 8 and then displayed on the Braun tube CRT. At this time, the video signal processed by the color signal processing circuit 8 is displayed on the Braun tube CRT in the PIP mode as shown in FIG. 2 or the POP mode as shown in FIG. 3 according to the function selected by the key matrix unit 9.

FIG. 4 is a view illustrating, in detail, pictures displayed in the POP mode in the general television receiver. The POP mode is performed to search for a program of a pre-stored channel. In the POP mode, two still sub-pictures and a moving sub-picture are displayed as shown in FIG. 4. The moving sub-picture is the picture being presently searched. The moving sub-picture will become a still sub-picture after the lapse of a predetermined time period (about one second). Then, the search is performed for input video signals of the pre-stored channel in the stored order.

However, the above-mentioned conventional input picture search apparatus has a disadvantage in that it is impossible to search for an external input video signal during searching for the video signal inputted through the channel of the television receiver. Also, if any video signal to be searched is not present, a noise component is displayed, resulting in a degradation in a picture quality.

SUMMARY OF THE INVENTION

Therefore, the present invention has been made in view of the above problems, and it is an object of the present invention to provide an apparatus and a method for searching an input picture in a television receiver in which a video signal inputted through a channel of the television receiver and an external input video signal are searched together and a picture being presently searched is displayed as a continuously moving picture when a stop mode is selected during the search, so that the user can continue to watch a desired video signal.

In accordance with one aspect of the present invention, there is provided an apparatus for searching an input picture in a television receiver, comprising first tuning means for detecting a broadcasting signal received through an antenna; first intermediate frequency processing means for processing the broadcasting signal detected by said first tuning means at audio and video intermediate frequencies to separate audio and video signals from the broadcasting signal; video signal processing means for processing the video signal from said first intermediate frequency processing means so that it can be displayed as a main picture; key matrix means having a key for selecting a POP mode and a key for selecting a stop mode; control means for outputting a plurality of control signals to perform the POP and stop modes selected by said key matrix means; second tuning means for detecting a different broadcasting signal received through a different antenna; second intermediate frequency processing means for processing the broadcasting signal detected by said second tuning means at audio and video intermediate frequencies to separate audio and video signals from the broadcasting signal; switching means for selecting one of the video signal from said second intermediate frequency processing means and external input video signals under the control of said control means; synchronous signal detection means for detecting a synchronous signal from an output video signal from said switching means and outputting the detected synchronous signal to said control means, said control means being responsive to the synchronous signal from said synchronous signal detection means to determine whether the output video signal from said switching means is to be searched; PIP processing means for processing the output video signal from said switching means so that it can be displayed as a sub-picture; picture ratio conversion means for converting a ratio of an output video signal from said video signal processing means to an output video signal from said PIP processing means into a main picture to sub-picture ratio; and color signal processing means for displaying an output video signal from said picture ratio conversion means on a Braun tube.

In accordance with another aspect of the present invention, there is provided a method of searching an input picture in a television receiver, comprising the steps of (a) toggling a POP mode if a POP mode select key is selected, storing a channel of a sub-picture being presently displayed, releasing a stop mode, incrementing the present channel by one to select a pre-stored channel other than said stored channel and checking whether the toggled POP mode is ON; (b) checking whether a stop mode select key is selected if it is checked at said step (a) that the POP mode is OFF, checking whether the POP mode toggled at said step (a) is ON if it is checked that the stop mode select key is selected and toggling the stop mode if it is checked that the POP mode is ON; (c) checking whether a channel of a sub-picture being presently searched is the same as the channel stored at said step (a) if the POP mode is ON and the stop mode is OFF at said steps (a) and (b); (d) performing a switching operation if it is checked at said, step (c) that the channel of the sub-picture being presently searched is the same as the channel stored at said step (a); (e) checking whether a video signal inputted by said switching operation at said step (d) is a television broadcasting signal, incrementing the channel of the sub-picture being presently searched by one if it is checked that the video signal inputted by said switching operation at said step (d) is the television broadcasting signal and displaying a moved video signal of the incremented channel; and (f) selecting external input video signals if it is checked at said step (e) that the video signal inputted by said switching operation at said step (d) is not the television broadcasting signal, checking the presence of synchronous signals in the selected external input video signals, displaying the selected external input video signals as sub-pictures upon the presence of the synchronous signals therein and moving sequentially the sub-pictures in the middle of the search.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 5:
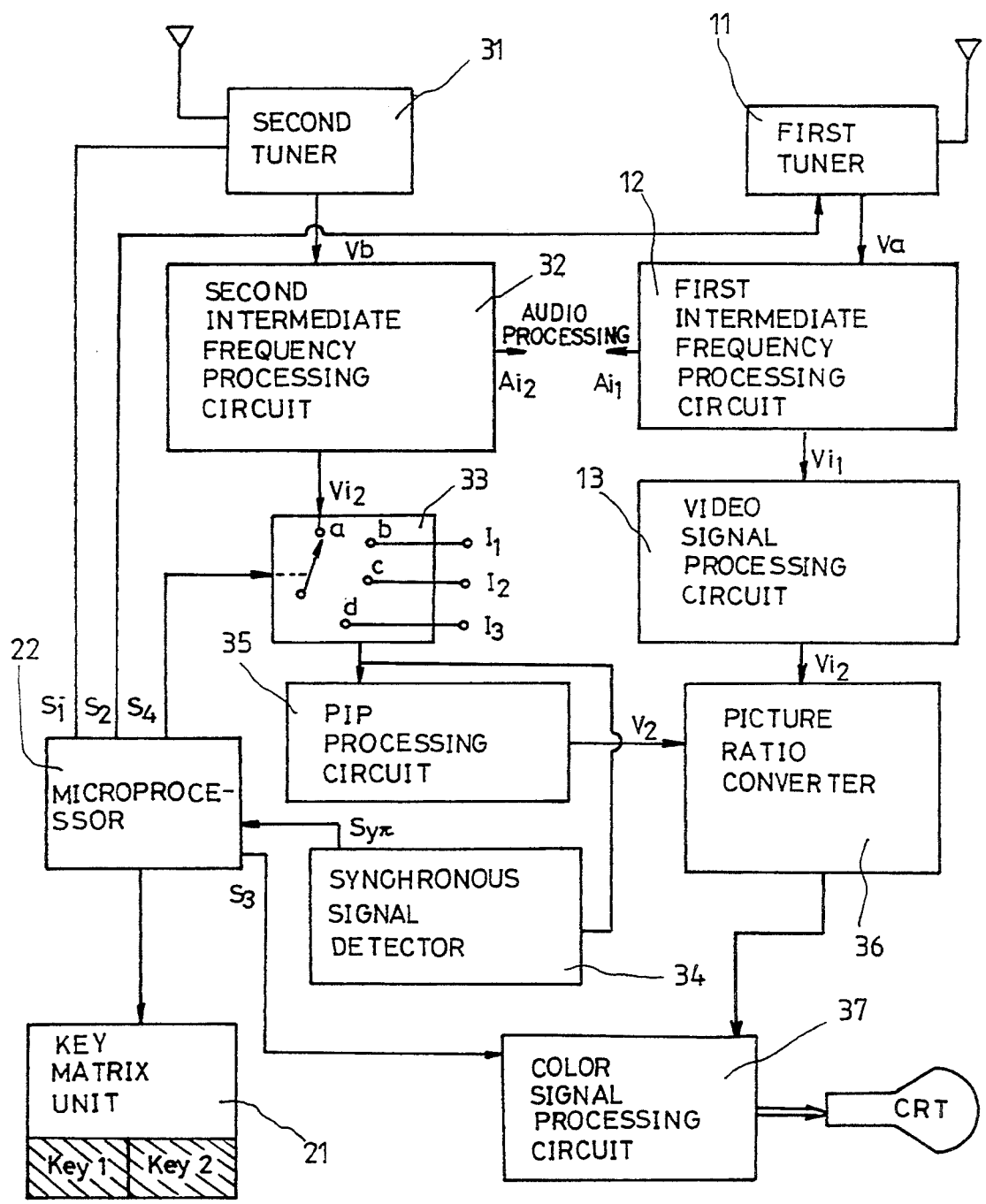
FIG. 5 is a block diagram of an apparatus for searching an input picture in a television receiver in accordance with the present invention.

Referring to FIG. 5, there is shown a block diagram of an apparatus for searching an input picture in a television receiver in accordance with the present invention. As shown in this drawing, the input picture search apparatus comprises a first tuner 11 for detecting a broadcasting signal received through an antenna, a first intermediate frequency processing circuit 12 for processing the broadcasting signal Va detected by the first tuner 11 at audio and video intermediate frequencies to separate audio and video signals Ai1 and Vi1 from the broadcasting signal Va, and a video signal processing circuit 13 for processing the video signal Vi1 from the first intermediate frequency processing circuit 12 so that it can be displayed as a main picture.

A key matrix unit 21 is provided in the input picture search apparatus to select a POP mode and a stop mode. The key matrix unit 21 has a POP mode select key Key1 and a stop mode select key Key2.

A microprocessor 22 is also provided in the input picture search apparatus to output a plurality of control signals S1–S4 to perform the POP and stop modes selected by the key matrix unit 21.

The input picture search apparatus also comprises a second tuner 31 for detecting a different broadcasting signal received through a different antenna, a second intermediate frequency processing circuit 32 for processing the broadcasting signal Vb detected by the second tuner 31 at audio and video intermediate frequencies to, separate audio and video signals Ai2 and Vi2 from the broadcasting signal Vb, a switching circuit 33 for selecting one of the video signal Vi2 from the second intermediate frequency processing circuit 32 and external input video signals in response to the control signal S4 from the microprocessor 22, and a synchronous signal detector 34 for detecting a synchronous signal from an output video signal from the switching circuit 33 and outputting the detected synchronous signal to the microprocessor 22.

The microprocessor 22 is responsive to the synchronous signal from the synchronous signal detector 34 to determine whether the output video signal from the switching circuit 33 is to be searched.

A PIP processing circuit 35 is also provided in the input picture search apparatus to process the output video signal from the switching circuit 33 so that it can be displayed as a sub-picture.

A picture ratio converter 36 is also provided in the input picture search apparatus to convert a ratio of an output video signal V1 from the video signal processing circuit 13 to an output video signal V2 from the PIP processing circuit 35 into a main picture to sub-picture ratio.

A color signal processing circuit 37 is adapted to display an output video signal V3 from the picture ratio converter 36 on a Braun tube CRT.

The switching circuit 33 is provided with a switch for selecting one of the video signal Vi2 from the second intermediate frequency processing circuit 32 and the external input video signals I1-I3 in response to the control signal S4 from the microprocessor 22.

The operation of the input picture search apparatus with the above-mentioned construction in accordance with the present invention will hereinafter be described in detail with reference to FIGS. 5 and 6.

Figure 6A:
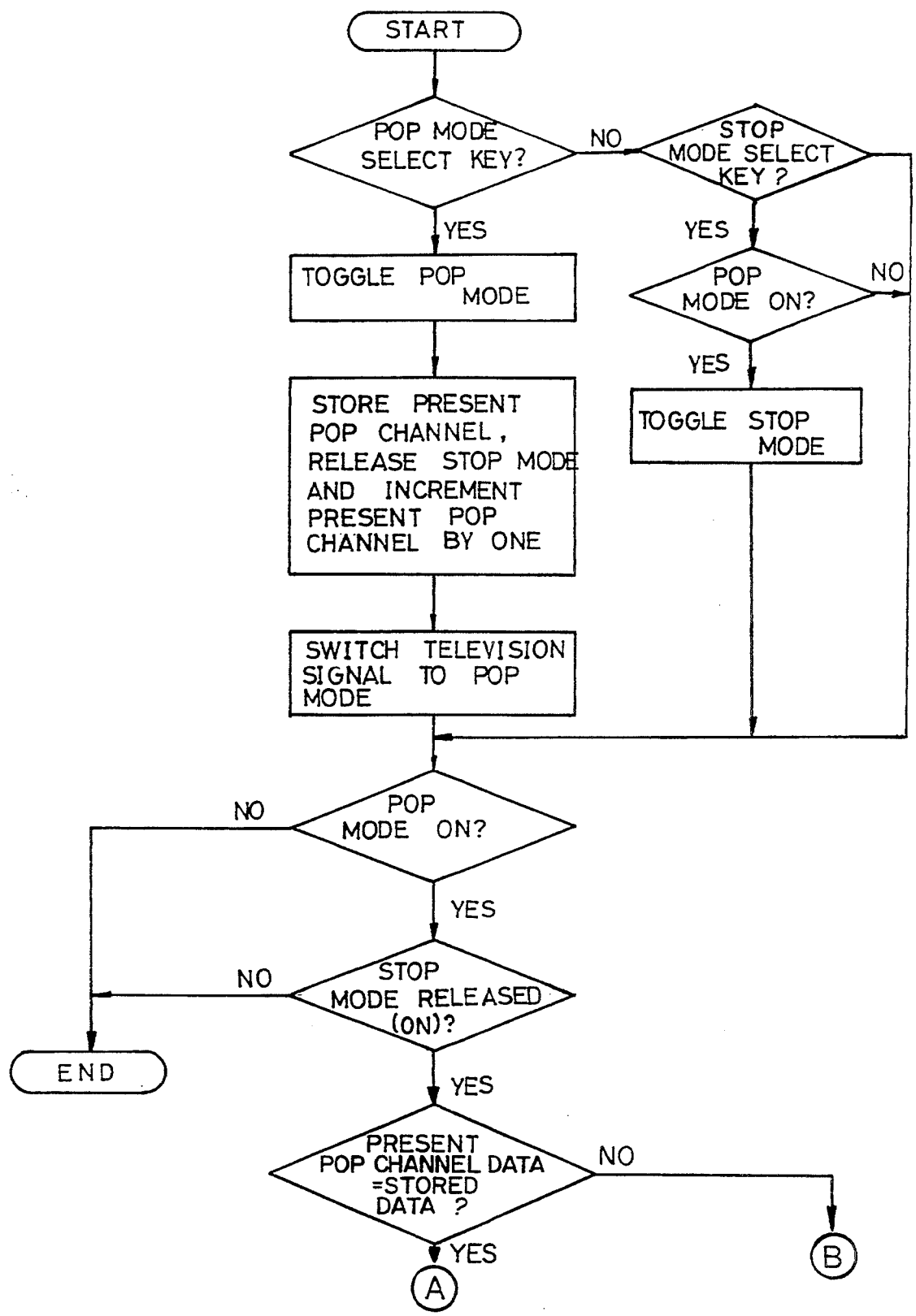
FIGS. 6A and 6B depict a flowchart illustrating the operation of the apparatus in FIG. 5 in accordance with the present invention.
Figure 6B:
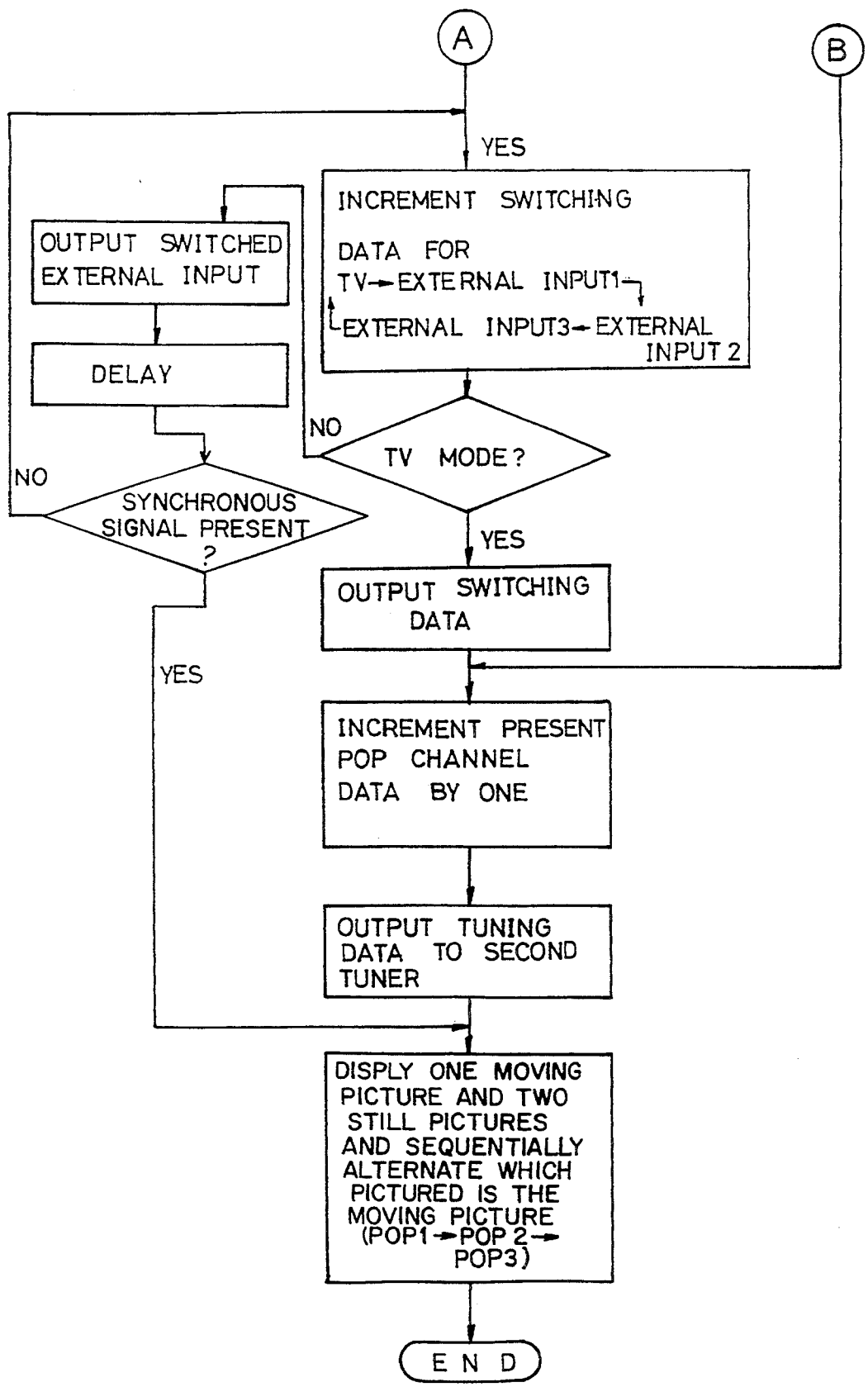

FIGS. 6A and 6B depict a flowchart illustrating the operation of the input picture search apparatus in FIG. 5 in accordance with the present invention.

First, the broadcasting signal Va detected by the first tuner 11 is processed at the audio and video intermediate frequencies by the first intermediate frequency processing circuit 12 and the broadcasting signal Vb detected by the second tuner 31 is processed at the audio and video intermediate frequencies by the second intermediate frequency processing circuit 32. As a result, the audio and video signals Ai1 and Vi1 are outputted from the first intermediate frequency processing circuit 12 and the audio and video signals Ai2 and Vi2 are outputted from the second intermediate frequency processing circuit 32. The video signal Vi1 from the first intermediate frequency processing circuit 12 is processed by the video signal processing circuit 13 so that it can be displayed as the main picture. As a result, the video signal processing circuit 13 outputs the resultant video signal V1 to be displayed as the main picture.

Under this condition, if the POP mode select key Key1 on the key matrix unit 21 is selected by the user, the POP mode is toggled under the control of the microprocessor 22. Namely, the POP mode is turned off when it is presently ON. On the contrary, the POP mode is turned on when it is presently OFF. Then, the microprocessor 22 stores a channel of the sub-picture being presently displayed, as initial channel data and increments the present channel by one to tune the television receiver to pre-stored channel data. Under this condition, a movable terminal of the switching circuit 33 is connected to a fixed terminal, a, thereof in response to the control signal S4 from the microprocessor 22. Then, the microprocessor 22 checks whether the POP mode is presently ON.

On the other hand, if the user does not select the POP mode select key Key1 on the key matrix unit 21, but the stop mode select key Key2 thereon, the microprocessor 22 checks whether the POP mode is presently ON. The stop mode is toggled under the control of the microprocessor 22. Namely, 25 the stop mode is turned off when it is presently ON. On the contrary, the stop mode is turned on when it is presently OFF.

If the stop mode select key Key2 on the key matrix unit 21 is not selected by the user or the POP mode is OFF, the microprocessor 22 checks whether the POP mode is ON and the stop mode is ON. If it is determined that the POP mode is ON and the stop mode is ON, the microprocessor 22 checks whether a channel of the sub-picture being presently displayed is the same as the stored initial channel data. If it is determined that the channel of the sub-picture being presently displayed is the same as the stored initial channel data, the microprocessor 22 outputs the control signal S4 to control the switching circuit 33.

Namely, when the movable terminal of the switching circuit 33 is being connected to the fixed terminal, a, thereof, it is switched to a fixed terminal b of the switching circuit 33 under the control of the microprocessor 22 to select the external video signal I1. Also, when the movable terminal of the switching circuit 33 is being connected to the fixed terminal b thereof, it is switched to a fixed terminal c of the switching circuit 33 under the control of the microprocessor 22 to select the external video signal I2.

The microprocessor 22 then checks whether the video signal from the switching circuit 33 is a television broadcasting signal. If it is determined that the video signal from the switching circuit 33 is the television broadcasting signal, the microprocessor 22 increments channel data of the video signal being presently searched by one to select the pre-stored next channel.

Subsequently, the video signal of the incremented channel is detected by the second tuner 31 and the second intermediate frequency processing circuit 32 and then applied to the PIP processing circuit 35 through the switching circuit 33. The ratio of the output video signal V1 from the video signal processing circuit 13 to the output video signal V2 from the PIP processing circuit 35 is converted into the main picture to sub-picture ratio by the picture ratio converter 36. Then, the output video signal. V3 from the picture ratio converter 36 is displayed as the main and sub-pictures on the Braun tube CRT by the color signal processing circuit 37.

Figure 1:
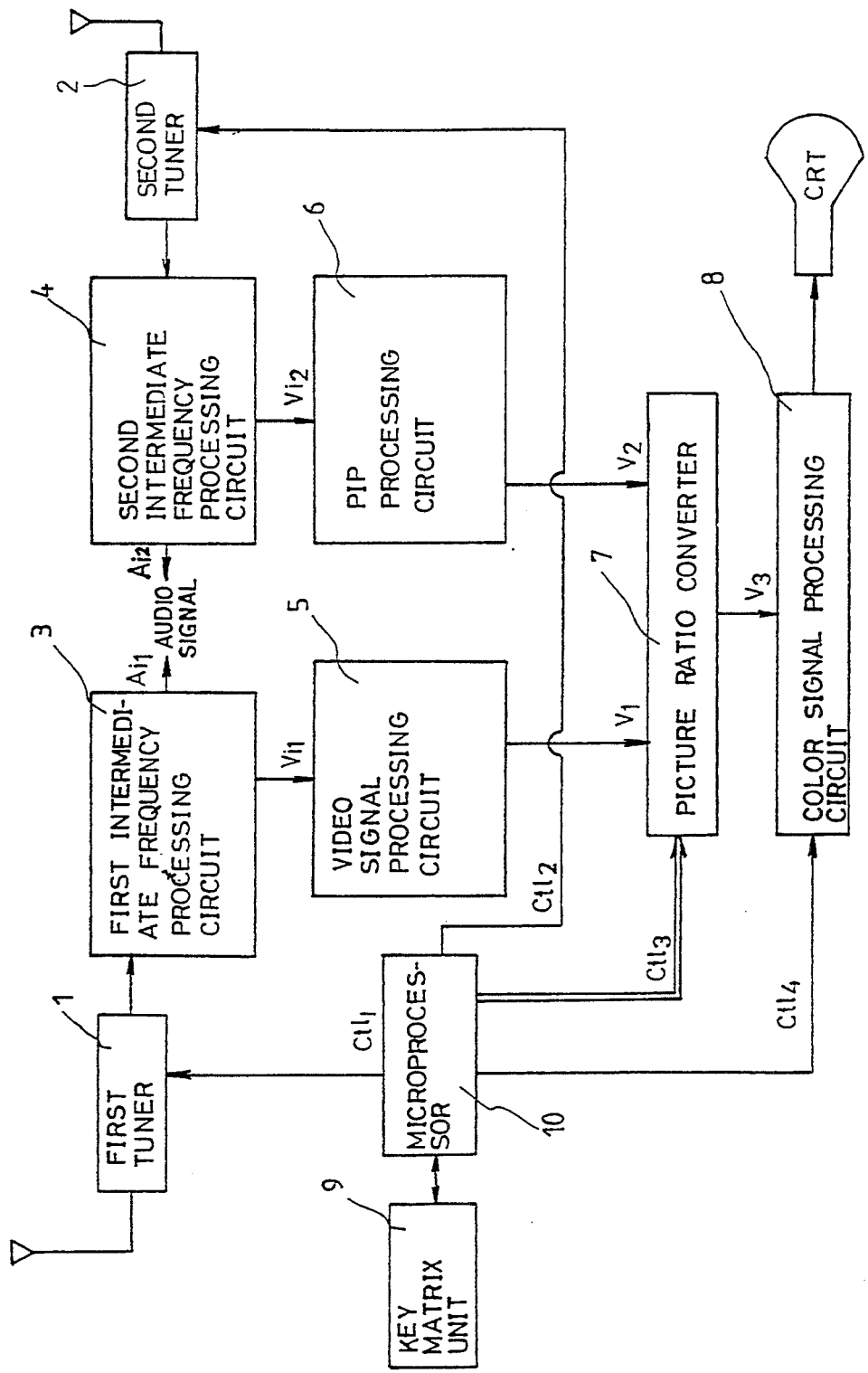
FIG. 1 is a block diagram of a conventional apparatus for searching an input picture in a television receiver.
Figure 2:
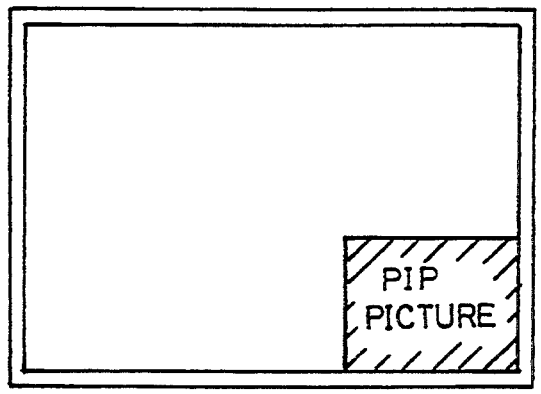
FIG. 2 is a view illustrating pictures displayed in a PIP mode in a general television receiver.
Figure 3:
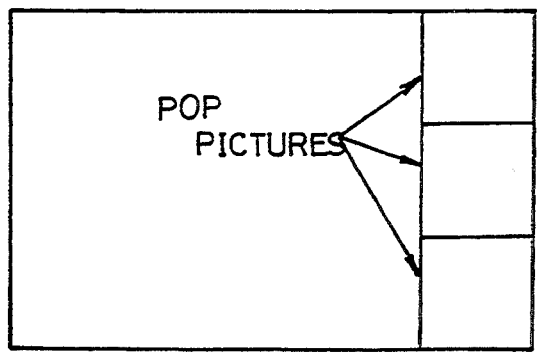
FIG. 3 is a view illustrating pictures displayed in a POP mode in the general television receiver.
Figure 4:
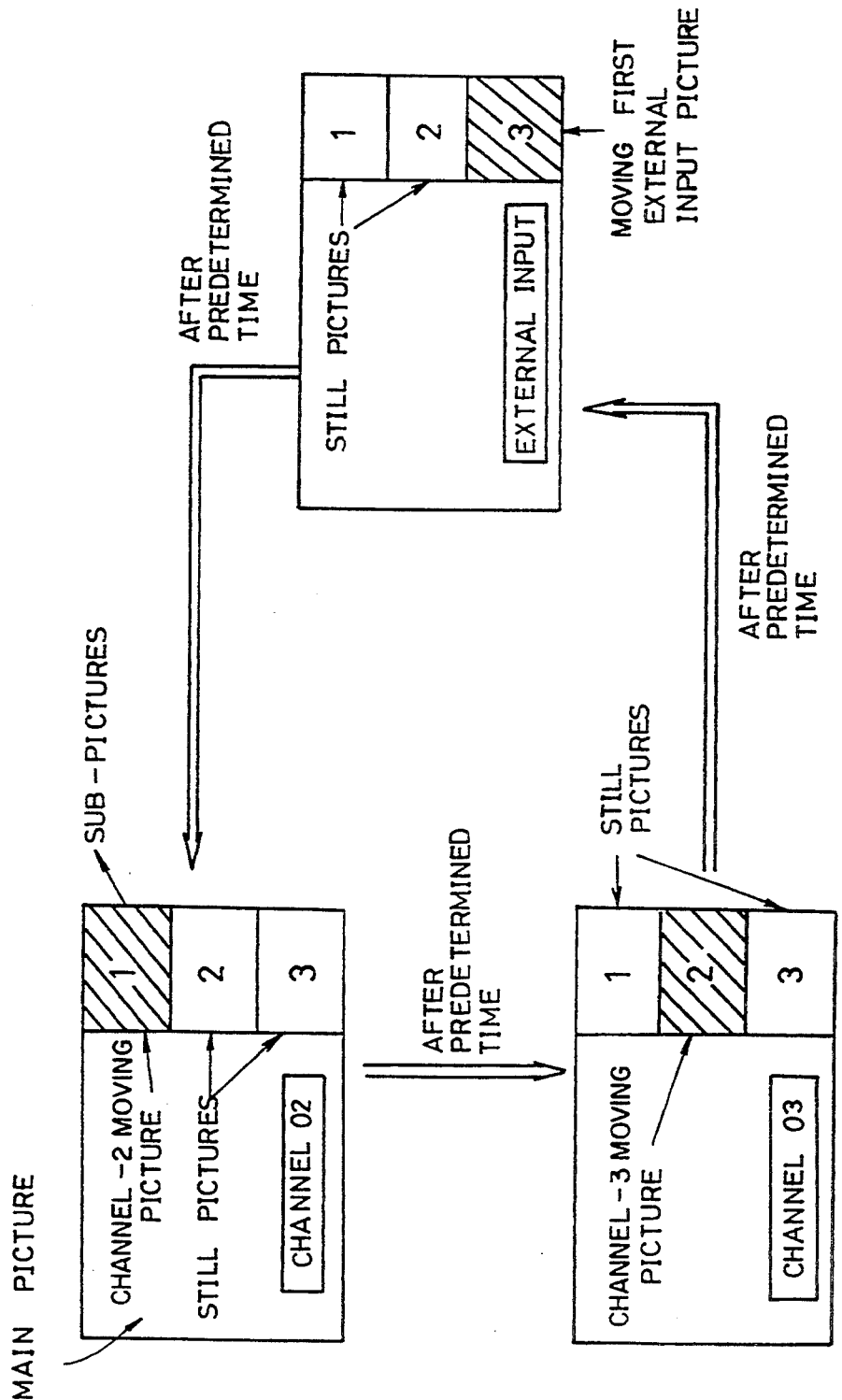
FIG. 4 is a view illustrating, in detail, pictures displayed in the POP mode in the general television receiver.

For example, in the television receiver in which 3 sub-pictures and one main picture can be displayed as shown in FIG. 4, two of the sub-pictures are still pictures and the remaining one is a moving picture, it is the picture which is being searched. After the lapse of a predetermined time period, one of the still picture is selected to be the moving picture, i.e., it is searched. Namely, the three sub-pictures are sequentially alternated as being the moving picture, and thereby searched.

On the other hand, upon application of the external input video signals I1-I3 through the switching circuit 33 to the PIP processing circuit 85, the process of the external input video signals II-I3 is delayed in the PIP processing circuit 35 because of the detection of the synchronous signals SYN in the synchronous signal detector 34. In other words, at that time that the synchronous signals SYN are detected from the external input video signals I1-I3 by the synchronous signal detector 34, the external input video signals I1-I3 are processed by the PIP processing circuit 35 so that they can be displayed as the two still sub-pictures and one moving sub-pictures as shown in FIG. 4.

By the way, in the case where the POP mode is ON, the stop mode is OFF and the channel of the sub-picture being presently searched is not the same as the stored initial channel data, the video signal of the incremented channel is detected by the second tuner 31 and the second intermediate frequency processing circuit 32 and then applied to the PIP processing circuit 35 through the switching circuit 33. As a result, the video signal processed by the PIP processing circuit 35 is displayed as the sub-picture on the Braun tune CRT.

As apparent from the above description, according to the present invention, the video signal inputted through the channel of the television receiver and the external input video signal can be searched together. Also, the picture being presently searched is displayed as continuously moving, i.e., as a moving picture, when the stop mode is ON during the search. Further, if any video signal to be searched is not present, the search is stopped. These have the effect of obtaining a high picture quality Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed Is:

1. An apparatus for searching an input picture in a television receiver, comprising:
    first tuning means for detecting a broadcasting signal received through an antenna;
    first intermediate frequency processing means for processing the broadcasting signal detected by said first tuning means at audio and video intermediate frequencies to separate audio and video signals from the broadcasting signal;
    video signal processing means for processing the video signal from said first intermediate frequency processing means so that it can be displayed as a main picture;
    key matrix means having a key for selecting a POP mode and a key for selecting a stop mode;
    control means for outputting a plurality of control signals to perform the POP and stop modes selected by said key matrix means;
    second tuning means for detecting a different broadcasting signal received through a different antenna;
    second intermediate frequency processing means for processing the broadcasting signal detected by said second tuning means at audio and video intermediate frequencies to separate audio and video signals from the broadcasting signal;
    switching means for selecting one of the video signal from said second intermediate frequency processing means and external input video signals under the control of said control means;
    synchronous signal detection means for detecting a synchronous signal from an output video signal from said switching means and outputting the detected synchronous signal to said control means, said control means being responsive to the synchronous signal from said synchronous signal detection means to determine whether the output video signal from said switching means is to be searched;
    PIP processing means for processing the output video signal from said switching means so that it can be displayed as a sub-picture;
    picture ratio conversion means for converting a ratio of an output video signal from said video signal processing means to an output video signal from said PIP processing means into a main picture to sub-picture ratio; and
    color signal processing means for displaying an output video signal from said picture ratio conversion means on a Braun tube.

2. A method of searching an input picture in a television receiver, comprising the steps of:
    (a) toggling a POP mode if a POP mode select key is selected, storing a channel of a sub-picture being presently displayed, releasing a stop mode, incrementing the present channel by one to select a pre-stored channel other than said stored channel and checking whether the toggled POP mode is ON;
    (b) checking whether a stop mode select key is selected if it is determined at said step (a) that the POP mode is OFF, checking whether the POP mode toggled at said step (a) is ON if it is determined that the stop mode select key is selected and toggling the stop mode if it is determined that the POP mode is ON;
    (c) checking whether a channel of a sub-picture being presently searched is the same as the channel stored at said step (a) if the POP mode is ON and the stop mode is OFF at said steps (a) and (b);
    (d) performing a switching operation if it is determined at said step (c) that the channel of the sub-picture being presently searched is the same as the channel stored at said step (a);
    (e) checking whether a video signal inputted by said switching operation at said step (d) is a television broadcasting signal, incrementing the channel of the sub-picture being presently searched by one if it is determined that the video signal inputted by said switching operation at said step (d) is the television broadcasting signal and displaying a moving video signal of the incremented channel; and
    (f) selecting external input video signals if it is determined at said step (e) that the video signal inputted by said switching operation at said step (d) is not the television broadcasting signal, checking the presence of synchronous signals in the selected external input video signals, displaying the selected external input video signals as sub-pictures upon the presence of the synchronous signals therein and moving sequentially the sub-pictures during the search.

3. An apparatus for searching an input picture in a television receiver, as set forth in claim 1, wherein said switching means includes:
    a switch for selecting one of a television broadcasting signal and the external input video signals under the control of said control means.

* * * * *